INVENTORS
RAYMOND Q. ARMINGTON
GEORGE E. ARMINGTON
BY
*Hyde and Meyer*
ATTORNEYS INVENTORS
RAYMOND Q. ARMINGTON
GEORGE E. ARMINGTON
BY
*Hyde and Meyer*
ATTORNEYS Nov. 30, 1943.    R. Q. ARMINGTON ET AL    2,335,231
HYDRAULIC CONTROL SYSTEM FOR SCRAPERS
Filed May 6, 1940    6 Sheets-Sheet 4

INVENTORS
RAYMOND Q. ARMINGTON
GEORGE E. ARMINGTON
BY
Hyde and Meyer
ATTORNEYS

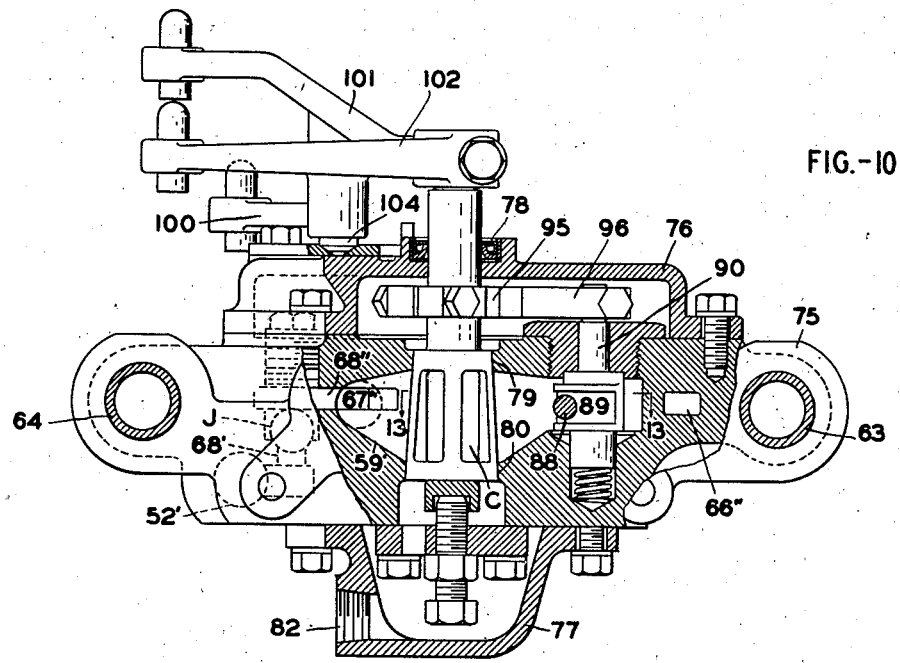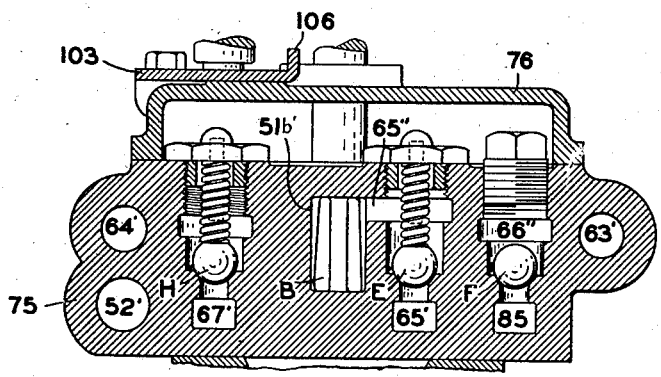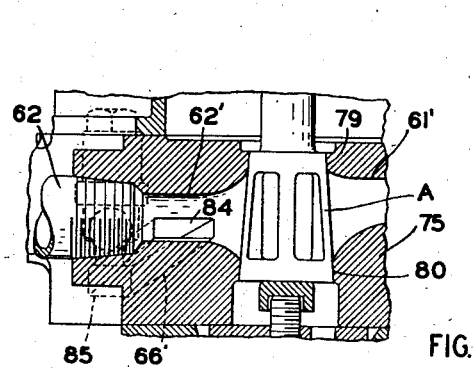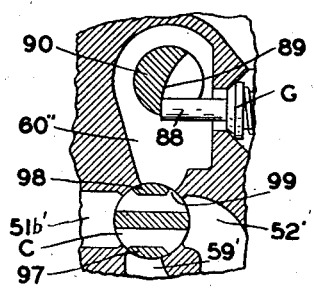

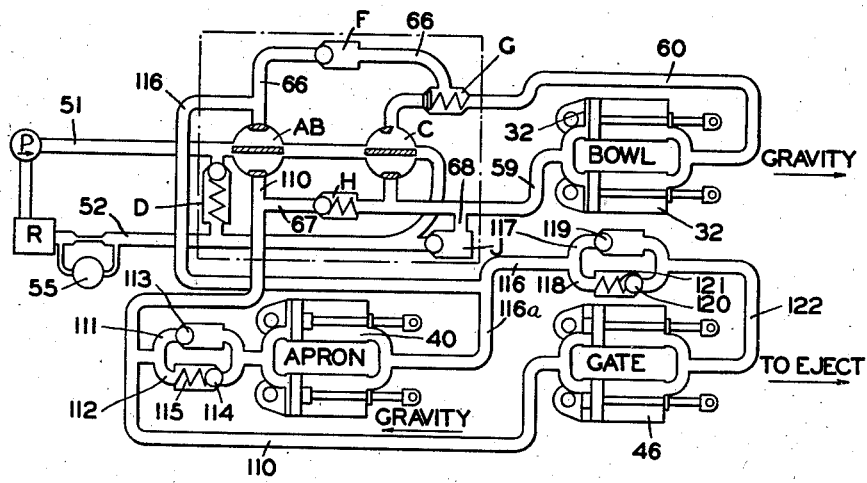

Patented Nov. 30, 1943

2,335,231

UNITED STATES PATENT OFFICE 2,335,231

HYDRAULIC CONTROL SYSTEM FOR SCRAPERS

Raymond Q. Armington, Shaker Heights, and George E. Armington, South Euclid, Ohio, assignors to The Euclid Road Machinery Company, Euclid, Ohio, a corporation of Ohio Application May 6, 1940, Serial No. 333,526

6 Claims. (Cl. 37—129)

This invention relates to improvements in a hydraulic control system for earth moving scrapers and the like.

Among the objects of the present invention are the provision of a compact, simplified and easily operated hydraulic system for causing the necessary movements of a scraper during the loading, carrying and unloading of earth or the like, so that the operation of the scraper is readily accomplished by an operator entirely in response to relatively simple movements of a few valve control manuals. The invention involves the arrangement of the valves and fluid supply lines in such a fashion that no harm can come to the operator or the scraper regardless of the manner of manipulation of the control valves. The specific objects and advantages of the invention will be apparent from the accompanying specifications and drawings and the essential features thereof will be summarized in the claims.

Figure 1:
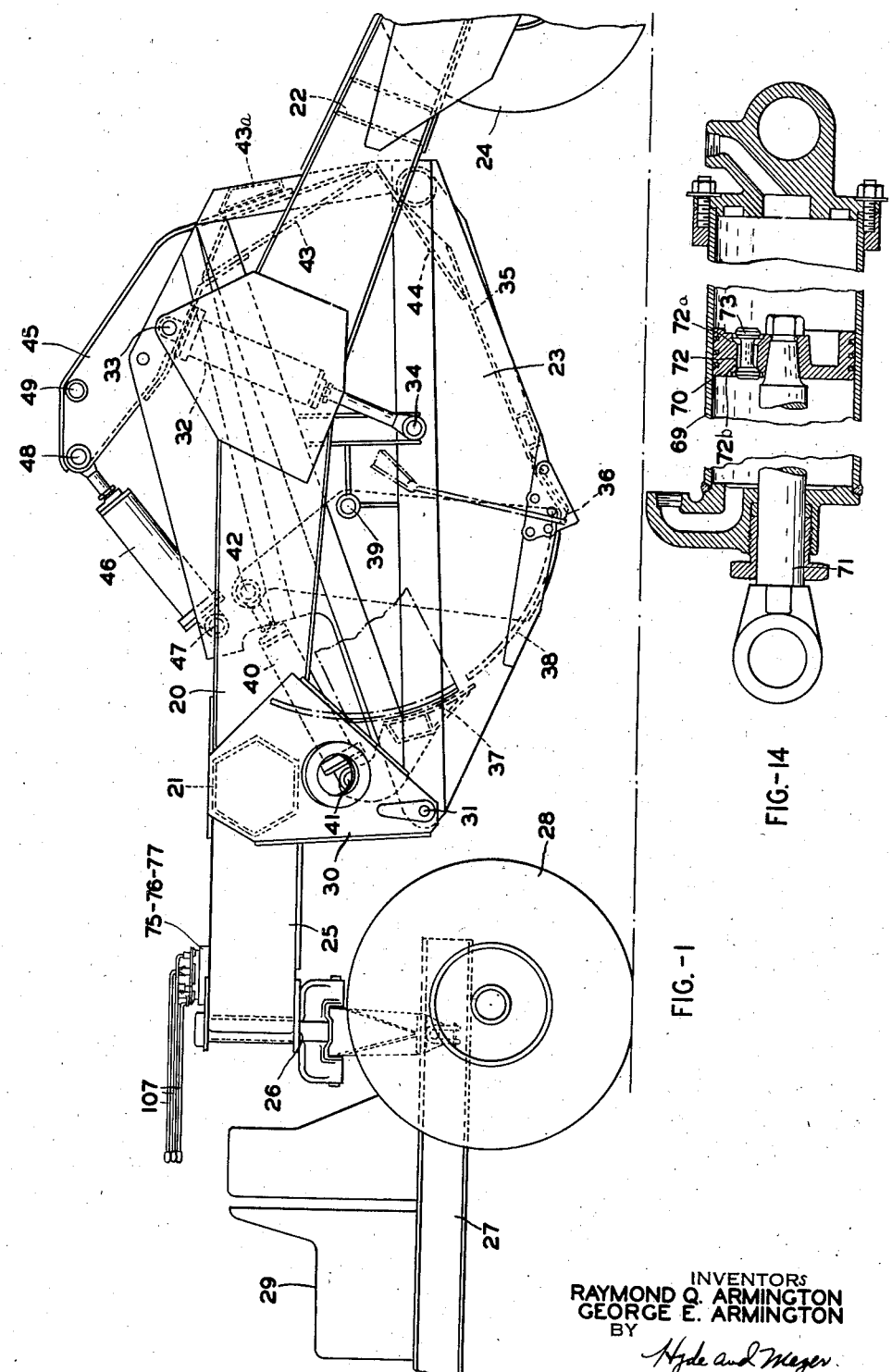
Figure 8:
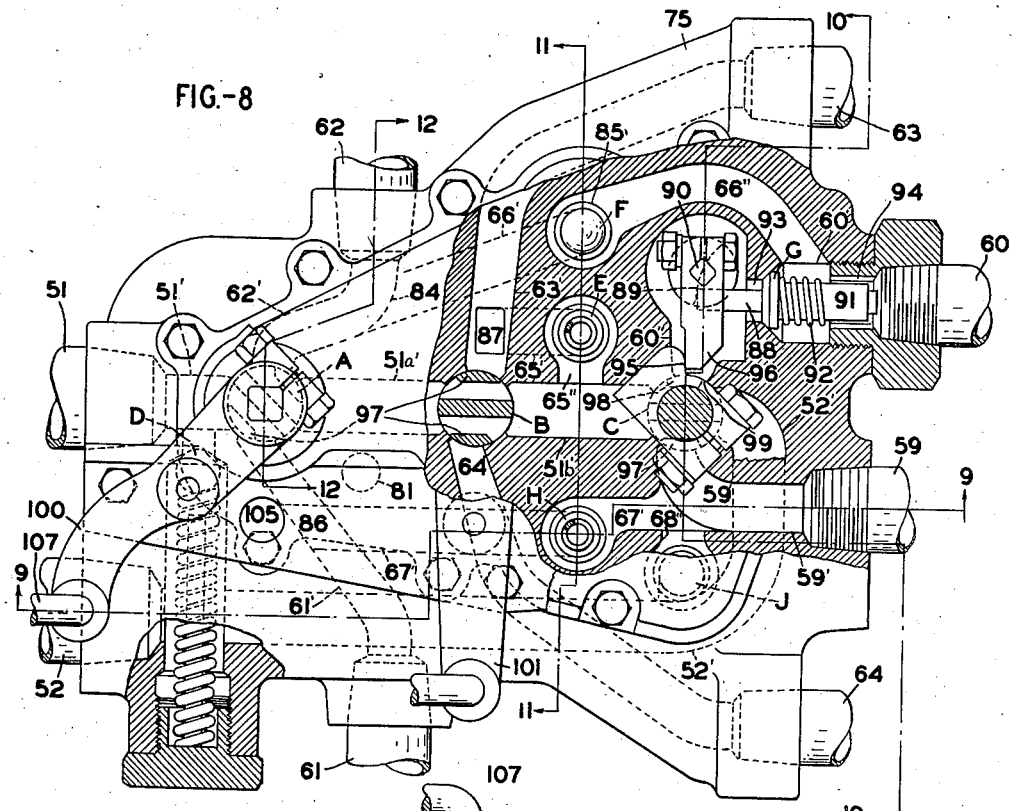
Figure 9:
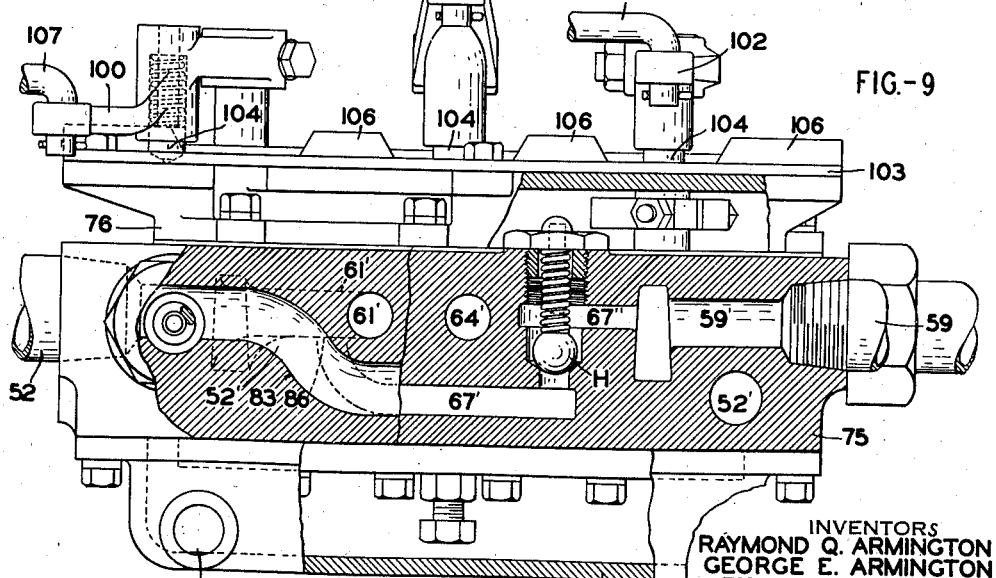

In the drawings, Fig. 1 is a side elevation of a scraper of a type adapted to be operated by our improved mechanism; Figs. 2 to 7 are diagrammatic views of the hydraulic mechanism illustrating various typical operations thereof; Fig. 8 is a top plan view of a valve block housing the control valves for the system, the view being partly broken away to more clearly show the parts; Fig. 9 is a longitudinal sectional view of the mechanism of Fig. 8 taken along the line 9—9 thereof; Fig. 10 is an end view taken from the right side of Fig. 8, the same being broken away approximately along the line 10—10 of Fig. 8 to more clearly show certain of the parts; Fig. 11 is a sectional view taken along the line 11—11 of Fig. 8; Fig. 12 is a partial sectional view taken along the line 12—12 of Fig. 8; Fig. 13 is a partial sectional view taken along the line 13—13 of Fig. 10; Fig. 14 is a central sectional view through one of the jacks used to operate the various mechanisms of the scraper; while Figs. 15 and 16 are diagrammatic views of a modification.

It will be realized as the description proceeds that certain features of our control mechanism are useful with various types of scrapers but for purposes of description we have shown the control mechanism as applied to a scraper more fully shown, described and claimed in our copending application Serial No. 304,078 filed November 13, 1939, now Patent No. 2,304,786 issued December 15, 1942, to which reference may be made for details of the scraper mechanism not completely described here.

For the sake of clearness a brief description of the above mentioned scraper will be given here.

It comprises a rigid frame having parallel side members 20 connected by a front cross beam 21 and a rear cross beam 22 so as to define an opening within which is hung a digging bowl 23. At the rear end the frame is supported on the ground by a pair of wheels 24 and a like pair could be provided in the front. However, in the scraper here shown a forwardly projecting portion 25 of the frame converges to a point where a supporting unit 26 rests upon a tractor or other vehicle 27 having one or more wheels 28 for supporting the front end of the scraper above the ground. It will be understood that means is provided for driving the vehicle 27 which need not be described here except to say that the operator of the tractor is seated at the point 29 and the controls for the scraper hydraulic system extend to a point adjacent the operator's seat so as to render control easy. Bracket members 30 depending from the side frame members 20 pivotally support the digging bowl at alined points 31. One or more jacks 32 are provided having a cylinder pivotally supported at 33 on a side frame member 20 and having a piston rod pivotally connected at 34 with the side wall structure of the bowl. The bowl comprises side walls connected by a bottom 35 which has a digging lip at its forward end 36. Both ends of the bowl are open, the forward end being partially closed by a fixed apron portion 37 and being closed or opened during a digging operation by the movable front apron 38 which is pivotally supported on the axis 39. One or more jacks 40 are provided to move the apron with a cylinder pivotally connected to the frame at 41 and with a piston rod pivotally connected to the apron moving structure at 42. An ejector gate 43 normally closes the rear end of the bowl and is movable forwardly to eject the earth out of the bowl during the discharging operation. Pivotally connected to the bottom of the gate is a flap 44 which underlies part of the dirt in the bowl and scrapes along the bottom during an ejecting operation. Means for moving the ejector gate to discharge dirt from the bowl comprises one or more upstanding arms 45 to each of which is connected a jack 46 having a cylinder pivotally mounted on a frame portion at 47 and pivotally connected to the ejector gate arm either at point 48 or point 49 depending upon the nature of the load. With the connection at the point 48 as shown in Fig. 1, more power is provided with less speed, such as would be utilized in heavy soils, whereas with the connection at the point 49, less power and more speed is provided as would be necessary in light soil. In Fig. 1 the apron 38 is shown in open position in dot-dash lines and the ejector gate 43 is shown in discharging position in dot-dash lines.

The hydraulic control system is shown diagrammatically in Figs. 2 to 7 without attempting to show the exact location of the various pipe lines on the scraper of Fig. 1 as it is obvious that these pipe lines may be run in any suitable manner so as not to interfere with the operation of the scraper. The important thing is the arrangement of the valves and pipe lines together with the operating jacks rather than the specific location of the lines and valves themselves except as hereinafter specifically pointed out and claimed.

The hydraulic system comprises a pump 50 supplying oil or other suitable fluid to a high pressure supply line 51. Fluid returns from the operating mechanism through a low pressure return line 52 to a reservoir 53 and thence by conduit 54 to the intake side of the pump. Preferably filter means is provided to keep the operating fluid clean and we have illustrated a filter 55 in a by-pass of the line 52, there being a suitable restriction 56 in the line 52 so as to force a certain portion of the returning fluid through the filter. A by-pass 57 is provided between lines 51 and 52 in which is located a check valve 58 or D permitting flow from line 51 to 52 in case of an excessive overload on the operating mechanism if some portion thereof fails to function as expected. To this end the spring 58a is a very heavy spring. Valves A, B and C are arranged in series in the line 51 so as to supply operating fluid as desired to the jacks 32, 40 and 46 during the operation of the scraper. Each of these is a two-passage, three-way valve having a neutral position and two operating positions. The arrow in connection with the jacks 46 indicates the direction of movement of the pistons to produce an ejecting operation. The arrows in connection with jacks 32 and 40 indicate the action of gravity on the bowl and front apron respectively, tending to move them downwardly. It will be understood that a single jack might be used in each case but that where two jacks are supplied for each piece of operating mechanism the flow and discharge of fluid to and from the jacks is arranged in parallel as shown in the various diagrams so that the two jacks operate exactly in unison for any one piece of mechanism. It will be apparent to those skilled in this art that separate cylinder and piston units might be provided for moving each piece of mechanism in the two directions necessary but for the sake of simplification we have shown double-acting pistons to provide the movement in two directions in each case. Therefore either line leading to the jacks may be a high pressure supply line or a low pressure discharge line, depending upon the direction in which the mechanism is being moved at the moment. The two supply lines for the jacks 32 are 59 and 60. The two supply lines for the jacks 40 are 61 and 62. The two supply lines for the jacks 46 are 63 and 64. Between lines 63 and 51b is a by-pass 65 in which is a spring loaded check valve E permitting flow to the line 51b only. Connecting lines 60 and 62 is a by-pass 66 in which is a gravity closed check valve F permitting flow from line 62 to line 60 only. In the line 60 and connected with the valve C by the line 60a is a spring loaded check valve G permitting flow from the line 60a to the line 60. Connecting lines 59 and 61 is a by-pass 67 in which is a spring closed check valve H permitting flow from line 67 to line 59. Connecting lines 52 and 59 is a short by-pass 68 in which is a gravity closed check valve J permitting flow from line 52 to line 59. The degree of loading of the various check valves obviously depends upon the capacity of the scraper. It has been assumed for the purposes of the present description that with a scraper having a digging bowl of approximately 12 yards capacity that 700 pounds per square inch would be necessary in the jacks 32 to hold the bowl up; that 500 pounds per square inch would be suitable in the jacks 32 for pushing the bowl into the ground during a digging operation; that the valve E would be set to open at approximately 110 pounds; that the valve H would be set to open at approximately 60 pounds; that the valve D would be set to open at approximately 1000 pounds and that the by-pass 56 and oil filter 55 would maintain approximately 35 pounds per square inch pressure in the line 52 under normal conditions.

Figure 2:
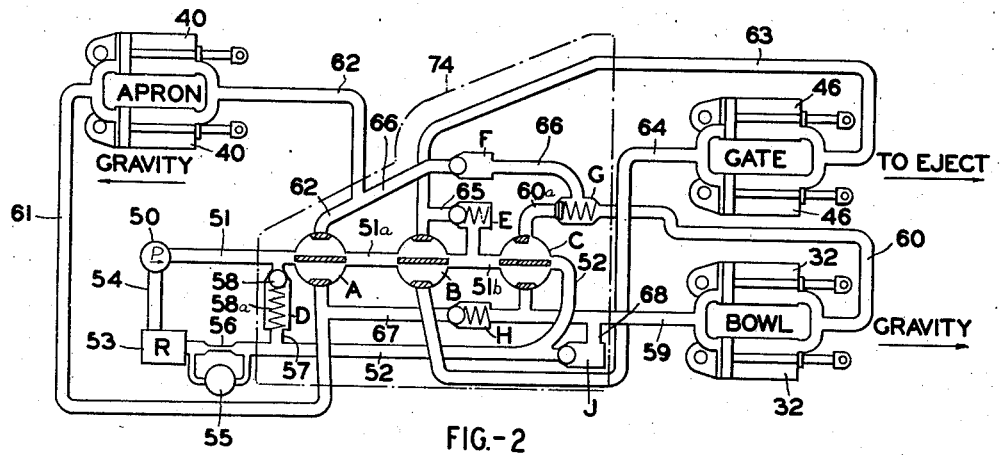

It is thought that the operation of the control system will be best understood by describing various typical operations which occur during the use of the scraper. In Fig. 2 the parts are shown in the position they assume when the bowl is loaded and the vehicle is travelling with the bowl in raised position, the front apron 38 closed and the ejector gate 43 in its rear position. Here the valves A, B and C are all set in neutral position to permit a direct flow from line 51 to line 52 and back to the reservoir and the pump. Under these conditions no pressure will build up in these lines above the normal 35 pounds. However the tendency of gravity to lower the bowl is resisted by trapped fluid in line 60 up to check valve G and in line 66 up to check valve F. This pressure acts against the right-hand faces of the pistons of jacks 32 and prevents any settling of the bowl.

Figure 3:
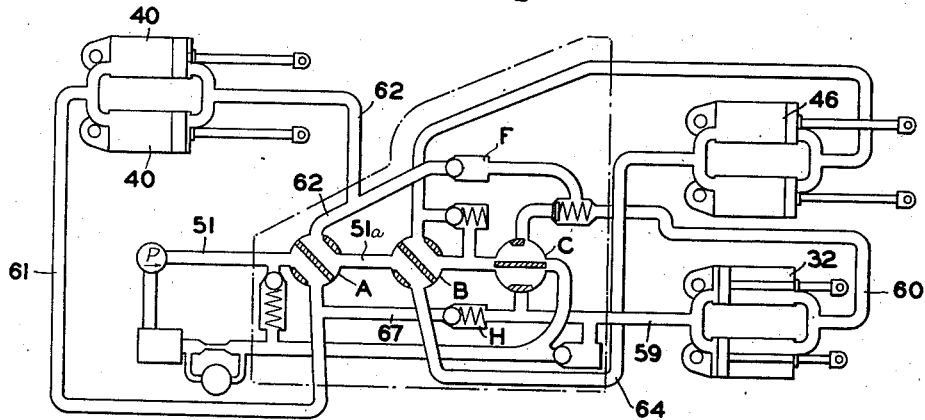

When it is desired to empty the bowl the operator moves valves A and B to the position shown in Fig. 3. Valve A directs pressure fluid from line 51 to line 61 and against the left-hand faces of the pistons of jacks 40. This moves the apron 38 in a direction to open it. As the pistons of jacks 40 move toward the right in Fig. 3 they compress fluid in lines 62, 51a and 64 so as to transmit pressure to the left faces of the jacks 46 causing ejecting movement of the gate 43 to the dot-dash position of Fig. 1. During this last mentioned operation pressure fluid from line 61 passes through line 67 and check valve H to line 59 where it acts together with gravity to tend to move the pistons of jack 32 toward the right and the resultant compression of fluid in line 60 is more than sufficient to hold check valve F closed.

Figure 4:
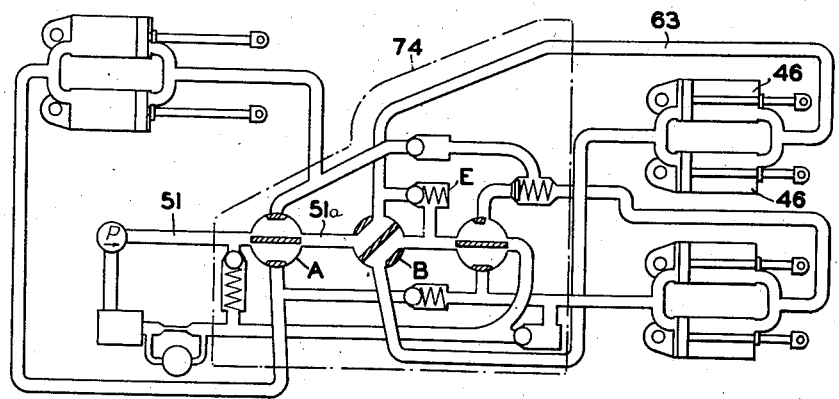

When the bowl is empty the operator moves valves A and B to the position of Fig. 4 for the purpose of returning the ejector gate 43 to its rearmost position. The flow of pressure fluid is then through lines 51, 51a and 63 against the right-hand faces of the pistons of jacks 46 thus causing a return of the gate 43 to its rear position. The purpose of the check valve E will now be explained. Each of the jacks is formed as shown more in detail in Fig. 14. It has not been attempted to show these details on the diagrammatic Figs. 2 to 7 inclusive. Each jack comprises a cylinder 69 housing a piston 70 connected with a piston rod 71. Suitable packing is provided about the piston rod to prevent leakage of fluid out of the cylinder. Passageways are provided at each end of the cylinder for the flow and discharge of fluid. Through each piston is provided one or more passageways 72 in which loosely fits a double-headed valve 73. The valves engage either the seat 72a or the seat 72b depending upon which side of the piston is subjected to the greater pressure. Obviously if the valve 73 is in the position shown in Fig. 14 with the pressure preponderating on the left-hand face of piston 70, then when the piston reaches the limit of its stroke at the right end of the cylinder, the valve 73 will strike against the cylinder head and be forced to a mid position where it engages neither of the valve seats, thus providing a bypass through the piston permitting the leakage of fluid from one side of the piston to the other. This automatically relieves pressure whenever one of the pistons reaches the limit of its movement at either end of its cylinder. Referring back to Fig. 1 if the piston rod of jack 46 is connected to the ejector arm 45 at the point 49 or in the "fast" position, then the piston of the jack 46 will be in the middle of the cylinder when the ejector gate reaches its rearmost position. At that point the ejector strikes a portion 43a of the frame so that it can go no further, thereafter pressure would build up to an undesired extent in the line 63 if the check valve E were not provided.

With the ejector in the rearmost position and the bowl empty and the apron 38 open, a normal operation would include the lowering of the bowl as the scraper moves forward for a digging operation to again fill the bowl. To accomplish this the operator sets the valves A, B and C in the position of Fig. 5. Pressure fluid is now supplied through lines 51, 51a and 51b to line 59 and against the left-hand faces of the pistons of jacks 32 thus aiding gravity in forcing the digging lip 36 of the bowl into the ground. The discharge of fluid from jacks 32 through the line 60 and back to line 52 is made possible by a connection between the operating mechanism for valve C and valve G so that as valve C is moved into the position of Fig. 5 it lifts valve G off its seat. At the same time the front apron is prevented from settling or moving toward closed position by fluid trapped in line 61 and in line 67 up to the check valve H.

It sometimes happens that the bowl will go down so fast due to the action of gravity that the pistons of jacks 32 move toward the right faster than fluid is supplied by the pump through lines 51 and 59 to the left-hand end of jacks 32. To prevent the forming of a vacuum in line 59 and the left-hand end of jacks 32 at such a time the check valve J is provided so that if the pressure in line 59 drops below the approximate 35 pounds in line 52 the check valve J will open and fluid will flow through by-pass 68 so as to maintain line 59 filled at all times.

Figure 6:
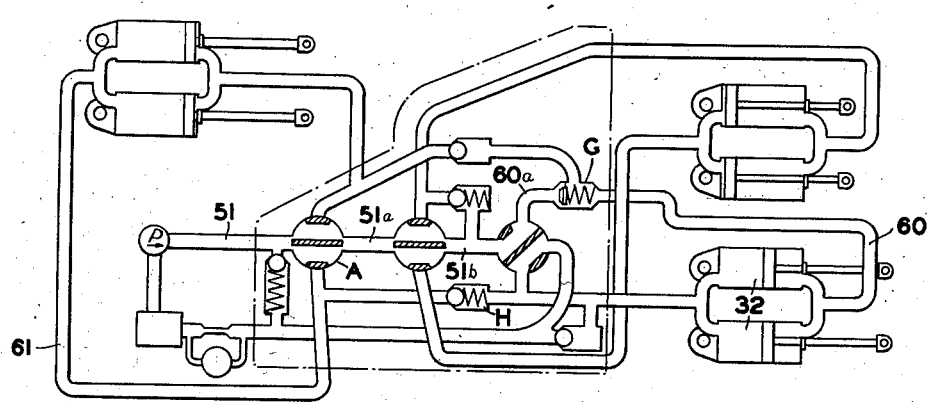

When it is desired to raise the bowl without performing any other operation at the same time, the valves are placed in the position of Fig. 6. Fluid under pressure then flows through lines 51, 51a, 51b, 60a and 60 to exert pressure against the right-hand faces of the pistons of jacks 32 thus raising the bowl. The pressure of the fluid flowing through line 60 is sufficient to lift the check valve G off its seat. During the above operation fluid is trapped in line 61 by closed valve A and check valve H so as to prevent settling of the front apron.

Figure 7:
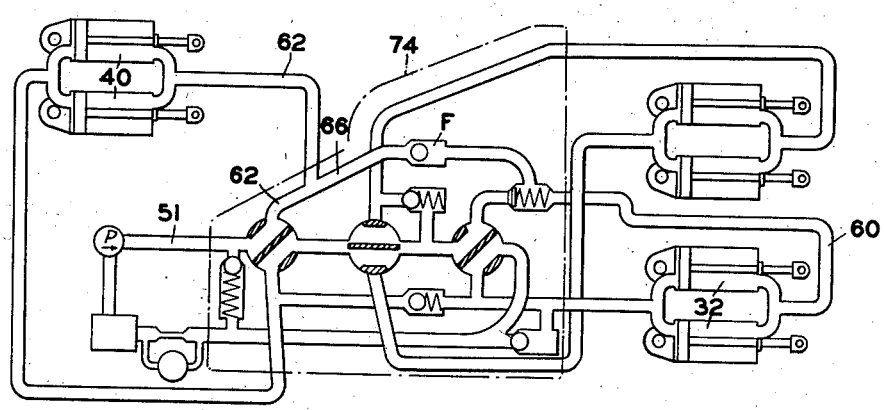

If it is desired to raise the bowl and at the same time lower the front apron as for instance when the bowl has received a full load of dirt, the valves are placed in the position of Fig. 7. Pressure fluid is then supplied in parallel to jacks 40 and jacks 32. The flow is from line 51 through line 62 to jacks 40 and through line 66, check valve F and line 60 to jacks 32. It results from this parallel supply to the two sets of jacks that the front apron is closed before the bowl is raised any appreciable amount if there is no obstruction to prevent closing of the front apron. This is because it takes less fluid pressure to operate the jacks 40 than to operate the jacks 32 under these conditions. If, however, the front of the bowl is deeply embedded or filled with material or if the apron 38 is held open by some obstruction, then jacks 40 may be retarded but jacks 32 will proceed to raise the bowl so that under some of the above circumstances the front of the bowl will clear itself and the apron will continue to close. If the dirt in the front of the bowl and extending over the lip is heavy clay or the like which prevents full closing of the apron 38, then the apron will close as far as possible and no spillage will occur due to the nature of the soil. Obviously if the dirt is of a lighter character the apron 38 will close completely.

The valves and pipe lines thus far described may be arranged in any suitable manner to carry out the functions described but for simplicity, compactness and ease of operation we have formed in a single structure all of the parts included within the dot-dash line 74 of Figs. 2 to 7. This structure is shown in Figs. 8 to 13. This structure comprises a main casting 75 to which is bolted a top cover 76 and a bottom cover 77. The plug valves A, B and C are arranged along a central line in this structure with their operating stems extending upwardly through the top cover through suitable packing 78. Any leakage which occurs at the points 79 and 80 where these valves engage the casting 75 is received in the top and bottom cover members and drained back to the reservoir 53. To this end the passageway 81 indicated in Fig. 8 passes completely through the casting 75 so as to drain the top cover member into the bottom cover member and the latter is provided with a drain line at the point 82.

For convenience of description I will refer to certain passageways in the casting 75 as being located either at an upper level or a lower level although there are no distinctive zones defining these two levels. The pipe line 51 connects with the casting 75 at the upper level as indicated in the various views and at one end of the casting. The lines 51', 51a' and 51b' are cored passageways in the castings 75 connecting the pockets in which the plug valves A, B and C are inserted. The passageway 52' leaves valve C at the lower level and extends from the right-hand end of Figs. 8 and 9 toward the left to the point 83 where it rises to the upper level and is connected by a pipe 52 back to the reservoir 53. The lines leading to jacks 40 communicate with valve A as indicated in the above described diagrams. The line 62 leaves valve A at the higher level through a cored passageway 62' in casting 75 and is connected by the pipe line 62 with one end of the jacks 40. The line 61 leaves valve A at the higher level through cored passageway 61' and is connected by pipe line 61 with the other end of jacks 40. The by-pass 66 leaves passageway 62' at the point 84 and slopes downwardly along the cored passageway 66' to the point 85 where it enters below the check valve F which is best seen in Fig. 11. From above check valve F the passageway 66'' leads to the cored passageway 60' at the right-hand end of casting 75 whence the pipe line 60 leads to one end of the jacks 32. The by-pass 67 leads out of cored passageway 61' at the point 86 where the cored passageway 67' at the lower level leads to a point beneath the check valve H. From a point above this valve the passageway 67'' leads into passageway 59'. The lines 63 and 64 lead away from valve B. Here the passageway 63' at the upper level leads to the right-hand end of casting 75 as seen in Fig. 8 where pipe line 63 connects with one end of the jacks 46. The by-pass 65 leaves the cored passageway 63' at the point 87 curving downwardly through passageway 65' to the lower level to a point below check valve E. From a point above this check valve the cored passageway 65'' connects with the passageway 51b'. Line 64 leads away from valve B at the upper level through passageway 64' which curves around to the right-hand end of casting 75 as viewed in Fig. 8 where the pipe line 64 connects with the jacks 46. The connections from valve C to the jacks 32 have already been partially described. The passageway 59' leads away from valve C at the upper level and connects with the pipe line 59 which leads to one end of the jacks 32. A short passageway 60'' leads through check valve G and passageway 60' to the pipe line 60 which connects with the other end of the jacks 32. Referring to the right side of Fig. 8 and the left side of Fig. 10, a short passageway 68' leads from passageway 52' to a point beneath check valve J, and a short passageway 68'' leads from above valve J to the passageway 59'.

The check valve G has a stem 88 extending in one direction and resting against a shoulder 89 formed on a shaft 90 which is journalled in casting 75. The valve G has another stem or projection 91 which supports the spring 92 which normally holds the valve G closed. Guiding surfaces at 93 and 94 respectively support the stems 88 and 91 while permitting free flow of fluid along the stems.

Figure 5:
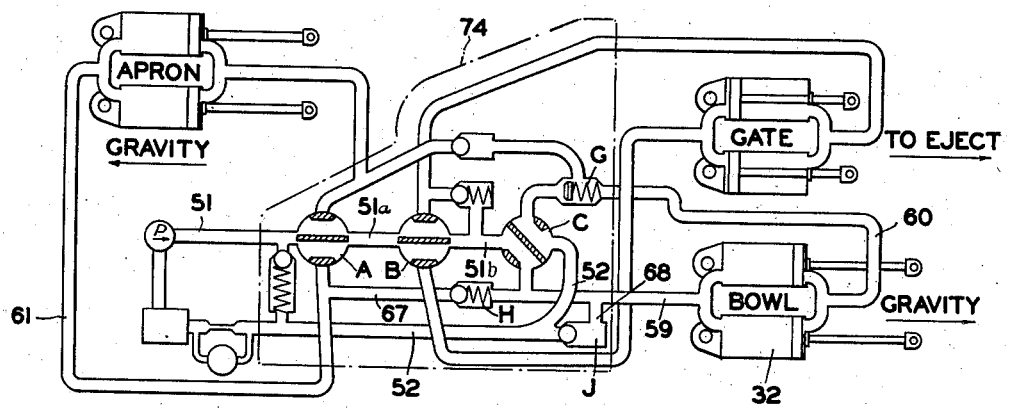

An operative connection is provided between the stem of valve C and the shaft 90 so as to lift valve G from its seat when valve C is moved to the position shown in Fig. 5. This connection comprises a cam 95 carried by the stem of valve C and a cam or arm 96 rigidly mounted on shaft 90. It will be obvious from an inspection of Fig. 8 that as cam 95 moves in a clockwise direction the arm 96 and shaft 90 will move in a counterclockwise direction causing the shoulder 89 to engage the valve stem 8C and move valve G toward the right against the action of spring 92.

Referring to Fig. 8, it will be noted that the plug valves A, B and C have solid portions 97 which when the valves A, B and C are in neutral position (that is with the passageways through the valves alined with passageways 51a' and 51b') close off the lateral passageways 61'', 62', 63', 64' and 59'. The valve C, however, has a portion 98 (see Fig. 13) which does not completely close the passageway 60'' when the valve is in the neutral position shown in Fig. 8 but instead a slight opening is left at the point 99. The purpose of this opening is to provide communication between the low pressure return passageway 52' and the passageway 60'' to a point to the left of check valve G in Fig. 8. This is a precaution to prevent the building up of pressure to the left of check valve G which might result in this valve being lifted from its seat and causing a false movement of the scraper mechanism. It also provides that valve G holds the pressure fluid which resists downward movement of the bowl and takes this load off of valve C.

The valves A, B and C are provided with the operating handles 100, 101 and 102 respectively. On top of the cover 76 is mounted a valve indexing plate 103. Each valve handle carries a spring pressed plunger 104. Suitable countersunk openings 105 in the plate 103 properly position the handles 100, 101 and 102 when their respective valves are in neutral position. Limiting projections or stops 106 on plate 103 limit the movement of the handles 100, 101 and 102 in either clockwise or counterclockwise direction from neutral position. This insures that valves A, B and C are always properly set to communicate with their adjacent passageways. The unitary structure 75—76—77 is preferably mounted on the forward portion of the frame at 25 as indicated in Fig. 1 and valve extension handles 107 extend to a point near the operator's seat on the tractor so that the operator may readily cause any scraper operation he desires.

While we have shown valves A, B and C as first, second and third respectively in line along the high pressure supply conduit, we do not desire to be limited to such a specific arrangement except as required by certain of the appended claims.

In Figs. 15 and 16, we have illustrated diagrammatically a modification involving only two control valves as distinguishing from the three control valves of the first modification. It will be understood that the jacks 40 control the front apron, the jacks 46 control the ejector gate, and the jacks 32 control the vertical position of the bowl, all as previously described. Valves and conduits having similar functions to those already described have been given the same reference characters. The first valve along conduit 51 has been marked AB, indicating that it carries out the functions of the separate valves A and B of the first modification. Briefly stated, the arrangement of Figs. 15 and 16 is similar to that already described, except that the front apron and the ejector gate are controlled by parallel connections. The operation of valve C to control the bowl is similar to that previously described and need not be repeated here.

As shown in Figs. 15 and 16, conduit 110 leads from valve AB (with branch 67 leading to valve H as before) to supply pressure fluid to the left-hand end of jacks 40 to move those jacks in apron-lifting direction. Conduit 110 also supplies pressure fluid to the left-hand end of jacks 46 to move the ejector gate in ejecting direction. Between conduit 110 and the left-hand end of jacks 40 we provide a pair of conduits 111 and 112 in parallel. In conduit 111 is check valve 113 preventing flow away from jacks 40 and permitting free flow toward the jacks. In conduit 112 is spring-loaded check valve 114 preventing flow toward the jacks 40 but permitting flow away from jacks 40 at a predetermined pressure sufficient to overcome spring 115. Another conduit 116 leading from the opposite side of valve AB and here shown as a branch of conduit 66 supplies pressure fluid to the right-hand end of jacks 40 to produce lowering of the apron and to the right-hand end of jacks 46 to produce backward movement of the ejector gate. Conduit 116 divides into two parallel conduits 117 and 118 just ahead of the right-hand end of jacks 46. In conduit 117 is check valve 119 permitting free flow toward jacks 46 but preventing flow away from the jacks. In conduit 118 is spring loaded check valve 120 preventing flow toward jacks 46 but permitting flow away from the jacks at a predetermined fluid pressure sufficient to overcome the spring 121.

The operation of the modification of Figs. 15 and 16 is similar in all respects to that described in connection with the first modification with the following exceptions: When it is desired to raise the front apron and to eject material from the bowl, the valve AB is moved to the position shown in Fig. 16. Pressure fluid then flows from conduit 51 through conduit 110, raising check valve 113 so that pressure fluid flows freely to the left-hand end of jacks 40 and the front apron is raised. Return flow occurs freely through conduits 116a, 116 and 66, valve AB, conduit 51a, valve C, and conduits 52 and 54 back to the pump. At the same time fluid from conduit 110 flows freely to the left-hand end of jacks 46 to move the ejector gate in direction to force material out of the bowl. Because the pressure required to move jacks 40 to raise the front apron is much less than that necessary to move jacks 46 for the ejecting action, the front apron is certain to be raised first before the ejector moves. To further insure such proper sequence of operations, the discharge from the right-hand end of jacks 46 is prevented entirely by check valve 119 and is permitted by valve 120 only after sufficient pressure has built up in discharge conduit 122 to overcome spring 121 which in the present instance may be set for approximately sixty pounds per square inch. In the usual operations, the pressure will not build up to this point until the front apron has reached its uppermost position and therefore the proper sequence of operations is assured. To carry out this operation, we have provided the projections 123 on the right side of the pistons of jacks 40 as viewed in Figs. 15 and 16 so that when the gate reaches its uppermost limit the piston bypass valves 73 may not be opened. Thus the pressure may be built up sufficiently thereafter to cause the movement of jacks 46 toward the right to cause an ejecting operation.

Movements of the ejector gate and front apron in the opposite directions are produced by turning the valve AB approximately 90° from the position shown in Fig. 16. Pressure fluid will then flow through conduits 66, 116 and 122 by way of check valve 119 to the right-hand end of jacks 46 so as to move the jacks 46 toward the left as viewed in Figs. 15 and 16 or in a direction to return the ejector gate to its rearmost position. Return flow from the left end of jacks 46 is by way of conduit 110 to valve AB and thence through conduits 51a, etc., as previously described. Normally no movement of jacks 40 connected with the front apron will occur during this action because fluid is trapped in the left end of jacks 40 by the check valves 113 and 114. However, the front gate may be forcibly moved downward after the ejector gate has reached its rearmost position for then sufficient pressure may be built up in conduit 116 to force the pistons of jacks 40 toward the left and to overcome spring 115 of check valve 114 which may be set for approximately sixty pounds. To produce this action projections 124 are provided on the pistons of jacks 46 to prevent the opening of the piston bypass valves 73 when the pistons of jacks 46 have reached the limit of their movement toward the left.

It will thus be seen that in the modification of Figs. 15 and 16 we have provided a simplified control of the machine first described and one which insures a proper sequence of the operations of the ejector gate and the front apron in whichever direction the parts are moved.

The valves and conduits within the dot-dash line 125 of Figs. 15 and 16 may be combined in a common valve body in all respects analogous to the structure indictated at 74 in the first modification.

What we claim is:

1. In combination, a wheel-supported digging bowl open at one end, an ejector gate movable through said bowl to discharge material therefrom, fluid operated means for moving said gate, fluid operated means for raising and lowering said bowl, fluid supply lines for each of said means, control valves in said supply lines, a bypass communicating between said supply lines, and a check valve in said by-pass permitting flow from said gate moving means supply line to said bowl moving means supply line, whereby when said ejector gate is held from movement fluid will flow through said check valve permitting bowl movement.

2. In combination, a wheel-supported digging bowl open at one end, an apron movable between an upper and lower position to open and close said end, a hydraulic jack for raising said apron, a supply line therefor, a control valve in said line having supply and cut-off positions, fluid operated means for raising and lowering said bowl, a high pressure fluid supply line for said means including a passageway in supply position when said apron jack control valve is in said cut-off position, a low pressure fluid return line, valve means for connecting said fluid operated means with said high pressure supply line and with said return line, a by-pass line connecting said first named supply line with said return line, and a loaded check valve in said by-pass line permitting flow to said return line only, whereby fluid is held trapped under pressure in said hydraulic jack to hold said apron raised when fluid is supplied to move said bowl and excess fluid in said trapped line can escape to said return line.

3. Earth moving apparatus comprising a wheel supported digging bowl, said bowl being open at its front end, an apron movable to open and close the front end of said bowl, an ejector gate movable through said bowl in opposite directions from front to rear to eject material from said bowl, a fluid motor controlling movement of said apron, a double-acting fluid motor controlling movement of said gate, a common supply line for supplying fluid to cause upward movement of said apron and forward movement of said gate, conduit means providing fluid exhaust from said gate motor when the latter moves said gate forward and providing fluid supply to said gate motor when the latter moves said gate rearward, and check valve means in said conduit means providing substantially free fluid flow toward said gate motor and providing flow away from said gate motor only at predetermined fluid pressure.

4. Earth moving apparatus comprising a wheel supported digging bowl, said bowl being open at its front end, an apron movable to open and close the front end of said bowl, an ejector gate movable through said bowl in opposite directions from front to rear to eject material from said bowl, double-acting fluid motors controlling movements of said apron and gate respectively, conduit means providing common fluid supply to said apron motor to move said apron upward and to said gate motor to move said gate forward, said conduit means also providing common exhaust from said motors when moving in the opposite directions, conduit means providing common fluid supply to said apron motor to move said apron downward and to said gate motor to move said gate backward, said last named conduit means also providing common exhaust from said motors when moving in the opposite directions, check valve means in said first named conduit means providing substantially free flow toward said apron motor and providing flow away from said apron motor only at predetermined fluid pressure, and check valve means in said second named conduit means providing substantially free fluid flow toward said gate motor and providing flow away from said gate motor only at predetermined fluid pressure.

5. In earth moving apparatus comprising a wheel-supported digging bowl open at its front end and an apron movable to open and close the front end of said bowl, a hydraulic control system comprising a double-acting cylinder and piston jack operatively connected with said bowl for moving it, two lines connected with said jack, one for bowl raising supply and bowl lowering discharge and the other for bowl lowering supply and bowl raising discharge, a double-acting cylinder and piston jack operatively connected with said apron for moving it, two lines connected with said apron jack, one for apron closing supply and apron opening discharge and the other for apron opening supply and apron closing discharge, a high pressure fluid supply line, a low pressure fluid return line, valves for controlling said bowl and apron, said valves being three-way double-passage valves having neutral positions wherein the valve passages are connected in series between said high-pressure supply and return lines, each of said valves having two operated positions in one of which one of its passages connects one of said bowl and apron jack supply lines respectively with said high-pressure supply line while the other of its passages connects the respective discharge lines with said return line, each of said valves in the other of its operated positions connects the other of said jack supply lines respectively with said high-pressure supply line while connecting other of said discharge lines respectively with said return line, a by-pass line connecting said apron closing supply line and said bowl raising supply line, a check valve in said by-pass line permitting flow from said apron closing supply line only, a check valve in said bowl raising supply line between the associated bowl-control valve and said by-pass line connection, said last named check valve permitting flow toward said bowl jack only, and an operative connection between said last named check valve and said bowl-control valve for opening the said check valve when said bowl-control valve connects said bowl raising supply and bowl lowering discharge line with said return line.

6. In earth moving apparatus comprising a wheel-supported digging bowl open at its front end and an apron movable to open and close the front end of said bowl, a hydraulic control system comprising a double-acting cylinder and piston jack operatively connected with said bowl for moving it, two lines connected with said jack, one for bowl raising supply and bowl lowering discharge and the other for bowl lowering supply and bowl raising discharge, a double-acting cylinder and piston jack operatively connected with said apron for moving it, two lines connected with said apron jack, one for apron closing supply and apron opening discharge and the other for apron opening supply and apron closing discharge, a high pressure fluid supply line, a low pressure fluid return line, valves for controlling said bowl and apron, said valves being three-way double-passage valves having neutral positions wherein the valve passages are connected in series between said high-pressure supply and return lines, each of said valves having two operated positions in one of which one of its passages connects one of said bowl and apron jack supply lines respectively with said high-pressure supply line while the other of its passages connects the respective discharge lines with said return line, each of said valves in the other of its operated positions connects the other of said jack supply lines respectively with said high-pressure supply line while connecting other of said discharge lines respectively with said return line, a by-pass line connecting said apron opening supply line and said bowl lowering supply line, a check valve in said by-pass line permitting flow from said apron opening supply line only, a by-pass line connecting said apron closing supply line and said bowl raising supply line, a check valve in said last named by-pass line permitting flow from said apron closing supply line only, a check valve in said bowl raising supply line between the associated bowl-control valve and said last named by-pass line connection, said last named check valve permitting flow toward said bowl jack only, and an operative connection between said last named check valve and said bowl-control valve for opening the said check valve when said bowl-control valve connects said bowl raising supply and bowl lowering discharge line with said return line.

RAYMOND Q. ARMINGTON.
GEORGE E. ARMINGTON.